April 19, 1960     A. F. OLD ET AL     2,933,187
METHOD AND APPARATUS FOR FLOTATION SEPARATION
OF LIGHTWEIGHT AGGREGATE AND PRODUCT
Filed Aug. 21, 1956
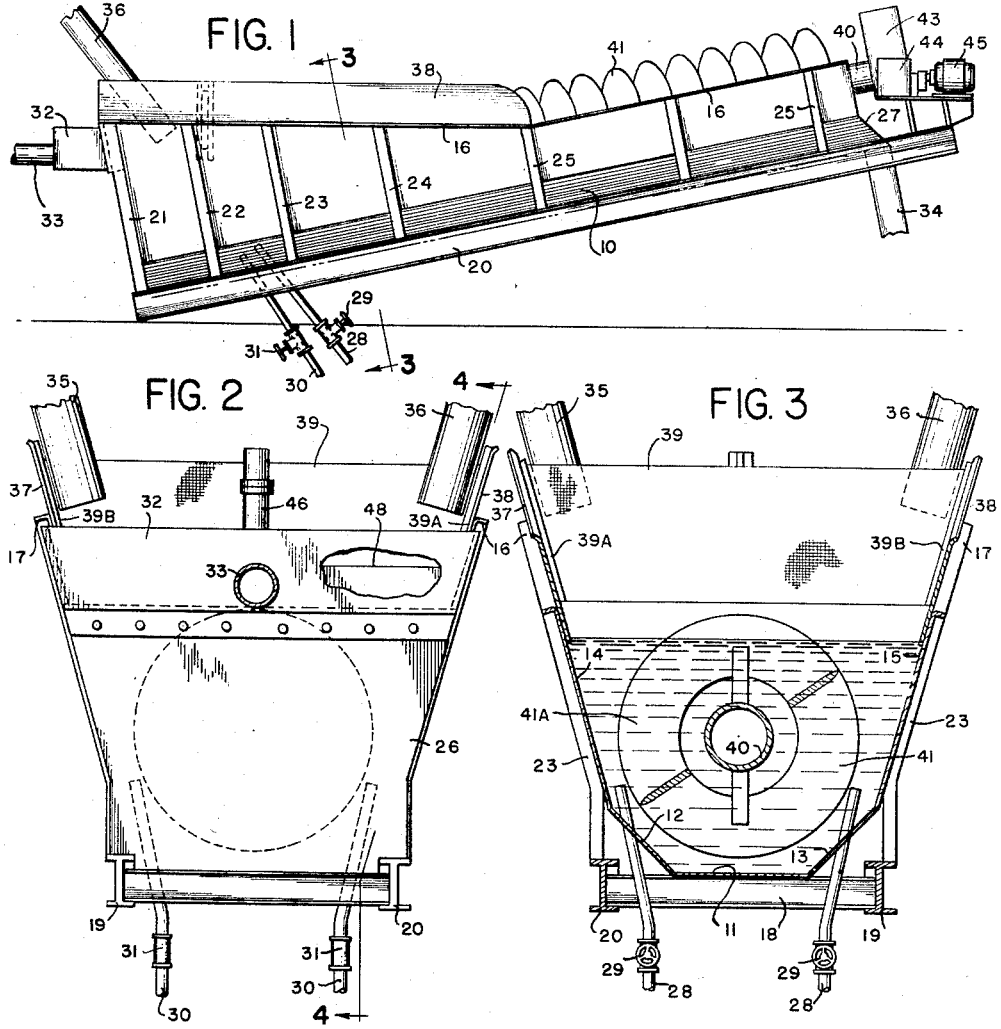
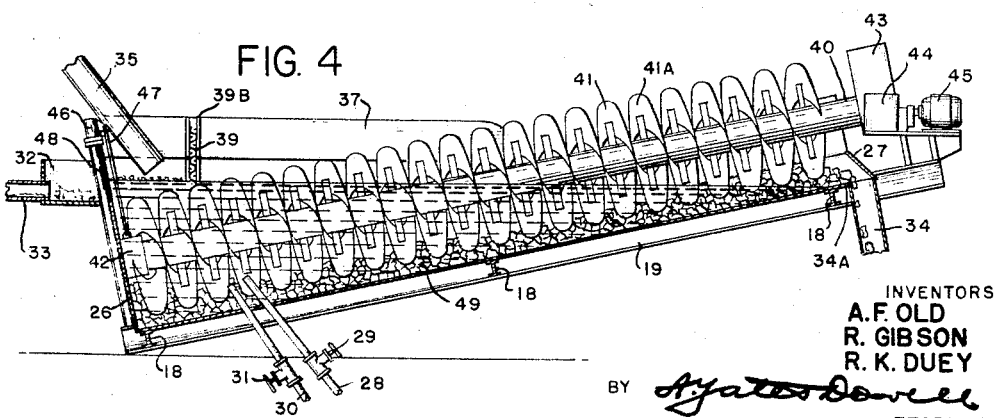
INVENTORS
A. F. OLD
R. GIBSON
R. K. DUEY
BY
ATTORNEY United States Patent Office 2,933,187
Patented Apr. 19, 1960

2,933,187

METHOD AND APPARATUS FOR FLOTATION SEPARATION OF LIGHTWEIGHT AGGREGATE AND PRODUCT

Albert Floyd Old, Bremo Bluff, Va., Richard Francis Gibson, Albemarle, N.C., and Robert Von K. Duey, Richmond, Va., assignors to Southern Lightweight Aggregate Corporation, Richmond, Va.

Application August 21, 1956, Serial No. 605,920

3 Claims. (Cl. 209—464)

This invention relates to concrete, to materials employed in the production thereof, to underwater fills, buildings, roads and other structures produced therefrom, and more particularly to the basic ingredients utilized in such production and by means of which the weight is controlled as well as to the method and equipment employed.

The invention relates specifically to concrete, to lightweight aggregate used in its manufacture, to the method or process of manufacture, and to the apparatus or equipment employed in such manufacture.

Specifically, the invention relates to the flotation separation of particles which constitute the lightweight aggregate, according to their specific gravity and to the control of such separation in order to obtain an end product having the desired uniform lightness or specific gravity. Heretofore aggregates have lacked desired uniformity with the result that the end products likewise have lacked such uniformity, particularly as to specific gravity, and these products have been less desirable on this account.

It is an object of the invention to overcome the problems enumerated and to provide equipment or apparatus, and a method by which lightweight aggregate of uniform specific gravity can be producted and of the desired characteristic weight.

Another object of the invention is to provide simple and practical means for obtaining controlled uniformity of the particles separated with regard to specific gravity as well as to provide a method for such separation.

Other objects and advantages of the invention will be apparent from the following description taken in conjunction with the accompanying drawing wherein:

Fig. 1 is a side elevation of a separator illustrating one application of the invention;

Fig. 2, an enlarged end view looking from left to right at the deep end of the separator;

Fig. 3, an enlarged section taken on the line 3—3 of Fig. 1; and

Fig. 4, a section taken on the line 4—4 of Fig. 2.

Briefly stated, the invention comprises a separation tank or receptacle in which the material to be separated is introduced, pipes or conduits for introducing water into the tank in a direction opposite to that of the introduction of the material, and in a manner to cause maximum influence one upon the other, and agitating and conveying means within the tank which serves to remove larger and heavier particles.

The present invention contemplates a trough or tank of appropriate dimensions as, for example, approximately 20 feet in length and of sufficient width to accommodate a screw type conveyor of suitable diameter as, for example, 48 inches, and the axis of which rises angularly at a rate of possibly 3¼ inches per foot. This tank is provided with an inclined bottom wall in which tank a combination agitator and conveyor in the form of a worm or drag is rotatably or transversely mounted, one end of which worm is submerged in the lower part of the deep end of the tank and the other end extends above the water line at the shallow end of the tank. The material to be separated is fed at an angle into the deep end of the tank and water is introduced into the said deep end of the tank but forced in a direction opposite to the direction of feeding of the material to be separated. Air likewise could be introduced into the tank alongside the water for the added agitation effect.

In the separation process, light material which floats will be discharged over the wall of the tank at the deep end and will fall into a chute from which it will be conveyed to a stockpile arranged and located so that the water may drain away. The heavier particles will be moved along the tank upwardly toward the remote end where it will be discharged.

A removable screen extending across the tank is mounted intermediate the ends of the tank for preventing the light material from moving with the heavy material toward the shallow end of the tank. The end wall at the shallow end of the tank serves as a baffle to guide the heavies to the heavies discharge chute.

With continued reference to the drawing, the invention comprises a separation tank or receptacle 10 in which the material to be separated is adapted to be introduced. This tank has a relatively straight bottom 11 disposed in inclined position and with diverging, relatively narrow, lower side portions 12 and 13 of substantially uniform width to which are connected slightly less diverging side portions 14 and 15. These sides taper from the deep end of the tank to near the central portion thereof and have their upper edges disposed in substantially horizontal position with reinforcing flanges 16 and 17 which additionally extend along the upper edges of the tapered portions of the sides and extend substantially parallel to the bottom 11 adjacent the shallow end of the tank.

The bottom of the tank 11 is supported on a series of transverse I-beams 18, the ends of which are attached to longitudinally disposed I-beams 19 and 20 and the sides of the tank are provided with pairs of reinforcing bars 21, 22, 23, 24 and 25, one bar of each pair being located on each side of the tank.

The tank is provided at its deep end with an end wall member 26 and at its shallow end with an end wall member 27. Water is supplied into the deep end adjacent each side of the tank through pipe lines 28, 28 controlled by valves 29, 29 and in close proximity to such water pipe lines air can be supplied through pipe lines 30, 30 controlled by valves 31, 31. Also the tank is provided with an overflow chute 32 which empties into an outwardly extending drain pipe 33. The shallow end of the tank is provided with a depending discharge chute 34 extending from a discharge lip 34A providing for removal of the heavies from the apparatus. In order to supply mixed material to be treated a pair of supply lines 35 and 36 extend at an angle of approximately 40° into the deep end of the tank. A pair of side extensions 37 and 38 are provided to keep the supplied material from spilling over the sides. A screen 39 is disposed between the sides 14 and 15 near the material supply lines 35 and 36. The screen 39 is preferably removably supported in channel shaped guides 39A, 39B attached to the sides 14 and 15 respectively. Due to the angularity of the ends of the supply lines 35 and 36 the material introduced therethrough will travel counter to the direction of flow of the water and/or air forced into the tanks through water supply pipes 28, 28 and air supply pipes 30, 30 and the mixture introduced will be agitated.

In order to increase the agitation and permit settling of the matter treated, at the deep end of the tank a combination agitator and conveyor is provided which includes a central tubular shaft 40 about which is attached encircling double pitched spiral blades 41, 41A the tubular shaft 40 being disposed generally parallel to the bottom 11 of the tank and having its lower end journalled in a suitable bearing 42 and its upper end extending outwardly over end wall member 27 and journalled in a suitable bearing in a gear box 43, and driven by means of transmission gearing 44 from a motor 45. The gear box 43 is pivotally mounted to permit raising and lowering of bearing 42 and the adjacent end of tubular shaft 40 by a hydraulic jack 46 having a cable 47 connected to bearing 42 for accomplishing the raising and lowering operation. It will be noted from the drawings that the discharge ends of the pipes 28, 28 and 30, 30 are disposed tangentially of the portions of the conveyor blade 41 in alignment with the discharge end of the supply lines 35 and 36 on opposite sides of the deep end of the tank.

In the operation of the device water and/or air will be introduced under pressure through the pipes 28 and/or 30 and will impinge upon material for example mixtures of light weight aggregate and heavier weight aggregates introduced through the pipes 35 and 36 and flowing in opposed relation to the water and air. The screen 39 confines the material flowing in and permits the material of lower specific gravity to be carried with the overflow liquid from the tank over the edge 48 and into the chute 32 to the outlet 33. The materials introduced will descend into the tank to be separated by water and air into their respective groups; particles that normally would sink in fresh water may be made to float by either increasing the velocity of water or air or through a combination of the two. Heavier particles will be agitated by the flow of the water and air through the pipes 28 and 30, and by the screw conveyor formed by blades 41 will be caused to travel up along the bottom of the tank under screen 39 until discharged over the lip 34A into the chute 34. The material having a low specific gravity will pass directly out from the large end of the machine while particles having greater specific gravity will sink and be carried to the small end of the machine and be discharged and collected for use.

From the above description, the operation of the apparatus and the method are believed to be obvious. A mixture of relatively light and heavy aggregate of varying degrees of fineness is fed thru supply lines 35 and 36 into a bath of liquid 49 in the tank 10, at an angle of approximately 40 degrees and, simultaneously therewith, water is supplied through pipes 28, 28 in controlled flow by means of valves 29, 29 and air may be supplied in varying amounts through pipes 30, 30 controlled by valves 31, 31. Simultaneously, the screw conveyor composed of tubular shaft 40 and blades 41 is rotated in a direction to move material from the deep end 26 to the shallow end 27, causing the material within the range of such screw conveyor to be moved upwardly. The material moved upwardly is the heavier material, since the lighter materials tend to float due to the buoyancy thereof and due to the flow of air and water upwardly as directed by pipes 28, 28 and 30, 30 respectively. The lighter particles remain adjacent to the surface and flow outwardly over the overflow edge 48 into the chute 32, and from the chute 32 such lightweight aggregate is removed by pipe 33 to a storage pipe or the like, and the liquid is drained off of such lightweight aggregate. The liquid drained off from such lightweight aggregate may be recirculated through water supply pipes 28, 28 and reused in the separation process, and such reused water carries an appreciable amount of fines therein which affect the density of the water whereby the characteristics of the separation of the lightweight aggregate from the heavier aggregate are affected. However, by controlling the velocity of the liquid and the velocity of the air, the rate of rotation of the screw, as well as by controlling the rate of feeding of the mixture of materials through the supply chutes 35 and 36, the effective specific gravity of the lightweight aggregate passing over the lip 48 and the specific gravity of the heavy aggregate, which is moved along by the conveyer can be controlled within accurate limits and within various ranges of specific gravities of the lightweight aggregate and the heavy weight aggregate. It has been found that the degree of separation can be controlled within 1% by the present apparatus and method, and that the products resulting from the use of the apparatus and method are thereby of greater value than the products previously obtainable.

What is claimed is:

1. Apparatus for classifying aggregate material on the basis of the specific gravity thereof comprising, a tank having an inclined bottom and deep and shallow ends, means to maintain a constant level of liquid in the tank, a screen positioned in said tank adjacent the deep end thereof and having a portion of the screen extending transversely below the surface of the liquid, means to supply aggregate to be classified in the region between the screen and the adjacent deep end of the tank, means to direct fluid upwardly into the region adjacent the screen and the adjacent deep end of the tank for maintaining the lighter aggregate materials in suspended condition while permitting the heavier aggregate materials to sink, screw conveyor means along the bottom of said tank from said deep end to said shallow end operative on the heavier sinking particles for moving said sinking particles upwardly from the deep end along the bottom of the tank to the shallow end thereof, means to discharge the heavy aggregate material from said shallow end of said tank, said means to supply aggregate and means to direct fluid being in substantial alignment adjacent the portions of the conveyor means in said deep end of the tank, said means to direct fluid comprising discharge pipes on opposite sides of said tank and directed generally tangent to the periphery of the screw conveyor and toward the deep end of said tank, the means to supply aggregate comprising a pair of pipes at opposite sides of said tank in substantial alignment with the fluid discharge pipes.

2. Apparatus for separating lightweight materials from heavyweight materials comprising a tank having an inclined bottom, an overflow edge at the deep end of the tank, a conveyor extending from the deep end of the tank to the shallow end of the tank, an outlet for heavy materials at the shallow end of the tank at a level approximately the same as the elevation of the overflow edge at the deep end of the tank, a separation screen extending across the deep end of the tank and downwardly into the tank to a portion just beneath the surface of liquid in said tank, downwardly extending conduits positioned at a level above the overflow edge directing a mixture of material to be classified into said tank between said deep end and said screen, and upwardly directed jets positioned adjacent the deep end of the tank and directed to cause a flow of fluid upwardly and at an angle to the region between said screen and said deep end of said tank, said structure being operative to cause the lightweight materials to flow over said edge at said deep end and heavyweight materials to drop to the inclined bottom and to be carried by said conveyor along said inclined bottom to said outlet at the shallow end of the tank thereby assuring accurate classification of the light and heavy materials.

3. The invention according to claim 2 in which the upwardly directed jets have their discharge openings closely adjacent the bottom of the deep end of the tank to thereby improve the agitating effect.

References Cited in the file of this patent

UNITED STATES PATENTS

| | | |
|---|---|---|
| 650,495 | Spencer | May 29, 1900 |
| 654,647 | Köppelmann | July 31, 1900 |
| 992,629 | Akins | May 16, 1911 |
| 2,025,841 | Young | Dec. 31, 1935 |
| 2,130,144 | McClave | Sept. 13, 1938 |
| 2,199,046 | Evenstad | Apr. 30, 1940 |
| 2,703,289 | Willson | Mar. 1, 1955 |
| 2,713,945 | Fontein | July 26, 1955 |
| 2,729,570 | Nichols | Jan. 3, 1956 |